（12）United States Patent
Forster

(10) Patent No.: US 12,056,553 B2
(45) Date of Patent: Aug. 6, 2024

(54) TUNING ASSEMBLIES FOR RFID CHIPS

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 124 days.

(21) Appl. No.: 17/787,653

(22) PCT Filed: Dec. 18, 2020

(86) PCT No.: PCT/US2020/065837
§ 371 (c)(1),
(2) Date: Jun. 21, 2022

(87) PCT Pub. No.: WO2021/133651
PCT Pub. Date: Jul. 1, 2021

(65) Prior Publication Data
US 2022/0414411 A1   Dec. 29, 2022

Related U.S. Application Data

(60) Provisional application No. 62/954,479, filed on Dec. 28, 2019.

(51) Int. Cl.
*G06K 19/07* (2006.01)
*G06K 19/077* (2006.01)

(52) U.S. Cl.
CPC ... *G06K 19/0726* (2013.01); *G06K 19/07788* (2013.01)

(58) Field of Classification Search
None
See application file for complete search history.

(56) References Cited

U.S. PATENT DOCUMENTS

| 5,953,642 | A | 9/1999 | Feldtkeller et al. |
| 8,217,733 | B2 | 7/2012 | Nohara |

(Continued)

FOREIGN PATENT DOCUMENTS

| EP | 0407848 | 1/1991 |
| EP | 1061663 | 12/2000 |

(Continued)

OTHER PUBLICATIONS

International Preliminary Report on Patentability dated Jun. 28, 2022 issued in corresponding IA No. PCT/US2020/065837 filed Dec. 18, 2020.

(Continued)

*Primary Examiner* — K. Wong

(57) ABSTRACT

A tuning assembly for an RFID chip includes an input port, a control unit, and a plurality of capacitors connected in parallel between the input port and the control unit. A selector circuit is coupled to each capacitor and to the control unit and is configured to selectively allow and prevent current flow through any of the capacitors in response to commands from the control unit, thereby adjusting the capacitance of the RFID chip. The commands include a command to always allow current flow through a capacitor, another command to always prevent current flow through a capacitor, and a third command to selectively allow and prevent current flow through a capacitor (e.g., for automatic adjustment of the capacitance of the RFID chip). The control unit may be programmed before or after the RFID chip is coupled to an antenna, including after a fully assembled RFID label has been attached to an article.

18 Claims, 2 Drawing Sheets

(56) References Cited

U.S. PATENT DOCUMENTS

| | | |
|---|---|---|
| 8,536,982 B2 | 9/2013 | Waters |
| 8,576,021 B2 | 11/2013 | Hill et al. |
| 9,070,058 B2 | 6/2015 | Kawata |
| 9,946,966 B2 * | 4/2018 | Kunc ................. G06K 19/0726 |
| 10,217,044 B2 | 2/2019 | Gila et al. |
| 2017/0104515 A1 * | 4/2017 | Holweg .................. H04B 5/77 |
| 2018/0197059 A1 | 7/2018 | Kunc et al. |

FOREIGN PATENT DOCUMENTS

| | | |
|---|---|---|
| EP | 2416470 | 11/2019 |
| GB | 2321726 | 8/1998 |
| JP | 2007-026239 | 2/2007 |
| JP | 2010-079451 | 4/2010 |
| JP | 2010-147743 | 7/2010 |
| JP | 2011-018414 | 1/2011 |
| JP | 2011-123692 | 6/2011 |
| JP | 2012-205216 | 10/2012 |
| JP | 2014-027513 | 2/2014 |
| WO | 96/13792 | 5/1996 |
| WO | 2010/116441 | 10/2010 |

OTHER PUBLICATIONS

International Search Report and Written Opinion dated Apr. 7, 2021 issued in corresponding IA No. PCT/US2020/065837 filed Dec. 18, 2020.

* cited by examiner

TUNING ASSEMBLIES FOR RFID CHIPS

CROSS-REFERENCE TO RELATED APPLICATION

The present application is a 371 of International Application No. PCT/US2020/065837, which was published in English on Jul. 1, 2021, and claims the benefit of U.S. Provisional Application No. 62/954,479 dated Dec. 28, 2019, both of which are incorporated herein by reference in their entireties.

FIELD

The present subject matter relates to tunable radio frequency identification ("RFID") devices. More particularly, the present subject matter relates to RFID chips having a capacitance that may be adjusted.

BACKGROUND

RFID tags and labels (collectively referred to herein as "devices") are widely used to associate an object with an identification code. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels.

At its most basic, an RFID device includes an RFID chip coupled to an antenna. RFID chips and antennas may be variously configured, with FIG. 1 illustrating one embodiment of the combination of an RFID chip "M" and an antenna "A", which is referred to herein as an RFID inlay N. The RFID chip M of FIG. 1 is coupled to a conductive ring "L" to define a reactive strap "S", while the antenna "A" (which is shown as a dipole antenna) is separated from the reactive strap "5". Although the antenna "A" is physically separated from the reactive strap "S", the two components work in combination to exchange signals with an RFID reader.

For RFID straps configured to be capacitively or conductively coupled to an antenna (by connection of the antenna to conductive pads of the strap, for example), the configuration of the antenna may be modified to adjust the frequency of the resulting RFID inlay. However, a reactive strap "5" of the type shown in FIG. 1 has a resonant frequency that is determined by the capacitance of the RFID chip "M" and the inductance of the conductive ring "L", such that reconfiguring the antenna "A" will not have the same effect that it would for a non-reactive strap. In other words, the reactive strap is part of the tuning loop in the case of a capacitively or conductively coupled strap, whereas a reactive strap "S" of the type shown in FIG. 1 is the tuning loop.

More particularly, the antenna response of an RFID inlay "N" of the type shown in FIG. 1 will consist of two basic poles, with one related to the resonant frequency of the reactive strap "S" and the other related to the antenna A. The coupling between the reactive strap "S" and the antenna "A" and the relative position in the frequency domain may be used to optimize the performance of the RFID inlay "N" at a particular frequency and in applications involving loading of dielectrics and proximity to metal or other RFID devices, for example.

The input of the RFID chip "M" may be considered as a resistive element "R" and a capacitive element "C", as shown in FIG. 2. In FIG. 2, an input port of the RFID chip "M" is identified at "P", while a capacitor of the RFID chip "M" is identified at "T" and a core of the RFID chip "M" is identified at B. In a conventional RFID chip "M" of the type shown in FIG. 2, the interconnection between the input port "P" and the core "B" via the capacitor "T" is fixed, such that the capacitance of the RFID chip "M" cannot be adjusted to adjust the resonant frequency of the reactive strap "N" (i.e., the RFID chip "M" is not tunable).

As a reactive strap may perform better at different frequencies, depending on a number of factors (e.g., the nature of the article to which the reactive strap is ultimately associated), it is known to provide a tunable RFID chip "U" (i.e., one having an adjustable capacitance), as shown in FIG. 3. In the embodiment of FIG. 3, the single capacitor "T" of FIG. 2 is replaced with three capacitors "T1", "T2", and "T3". One of the capacitors "T1" is similar to the single capacitor "T" of FIG. 2, providing the RFID chip "U" with a fixed, minimum capacitance, while the other two capacitors "T2" and "T3" (which may be referred to as "tunable" capacitors) are configured (under control of an auto-adjust circuit "D") to selectively receive current flow to adjust the total capacitance (and, hence, the resonant frequency) of the RFID chip U. In particular, as the RFID chip "U" attempts to power up upon receiving a signal from an RFID reader, the auto-adjust circuit "D" will automatically determine for each of the tunable capacitors "T2" and "T3" whether that capacitor will receive current flow so as to maximize the power received by the RFID chip "U" via the input port "P" (i.e., from the associated antenna). Such functionality, in which an RFID chip "U" is capable of automatically adjusting its capacitance in order to increase its sensitivity, is commonly referred to as "auto-tuning."

While the tunable RFID chip "U" of FIG. 3 may be an improvement upon the fixed frequency RFID chip "M" of FIG. 2, it is not without disadvantages. For example, all of the tunable capacitors "T2" and "T3" are tuned each time that the RFID chip "U" attempts to power up. By default, each tunable capacitor "T2" and "T3" will receive current flow when the RFID chip "U" attempts to power up. It may be the case that the starting capacitance (with each of the capacitors "T1", "T2", and "T3" receiving current flow) results in such a mismatch between the antenna and the RFID chip "U" that insufficient power is delivered to the auto-adjust circuit "D", such that a higher level of power (associated with lower sensitivity and the need for the RFID inlay to be closer to the RFID reader) is needed to start the auto-tuning process and optimize the power delivered to allow the RFID chip "U" to reach its operating threshold.

It would be advantageous to provide a tunable RFID chip that is less likely to initialize at a capacitance that prevents sufficient power delivery to the RFID chip.

Accordingly, tuning assemblies which allow for tuning of an RFID chip without initializing at a capacitance that prevents sufficient power delivery to the RFID chip, and methods of making and using thereof, are described herein.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

Tuning assemblies for RFID chips are described herein. The tuning assembly includes an input port, a control unit, and a plurality of capacitors connected in parallel between the input port and the control unit. A selector circuit is coupled to each capacitor and to the control unit and is configured to selectively allow and prevent current flow through any of the capacitors in response to commands from the control unit, thereby adjusting the capacitance of the RFID chip. The commands from the control unit to the selector circuit include a command to always allow current flow through any one or more of the capacitors, another command to always prevent current flow through any one or more of the capacitors, and a third command to selectively allow and prevent current flow through any one or more of the capacitors. In some embodiments, the tuning assembly enables the RFID chip to couple to a conductive ring and the combination of the RFID chip and the conductive ring defines a reactive strap.

Methods for manufacturing RFID inlays containing a tunable RFID chip are also described herein. The method includes providing a tuning assembly for the RFID chip, wherein the tuning assembly including an input port, a control unit, a plurality of capacitors connected in parallel between the input port and the control unit, and a selector circuit coupled to each of the capacitors and to the control unit and configured to selectively allow and prevent current flow through any of the capacitors in response to commands from the control unit to adjust the capacitance of the RFID chip. The control unit is programmed to issue a plurality of commands to the selector circuit, including a command to always allow current flow through any one or more of the capacitors, another command to always prevent current flow through any one or more of the capacitors, and a third command to selectively allow and prevent current flow through any one or more of the capacitors. The RFID chip is coupled to an antenna to define an RFID inlay. In some embodiments, the RFID chip is coupled to an antenna as part of a reactive strap to define the RFID inlay.

DETAILED DESCRIPTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
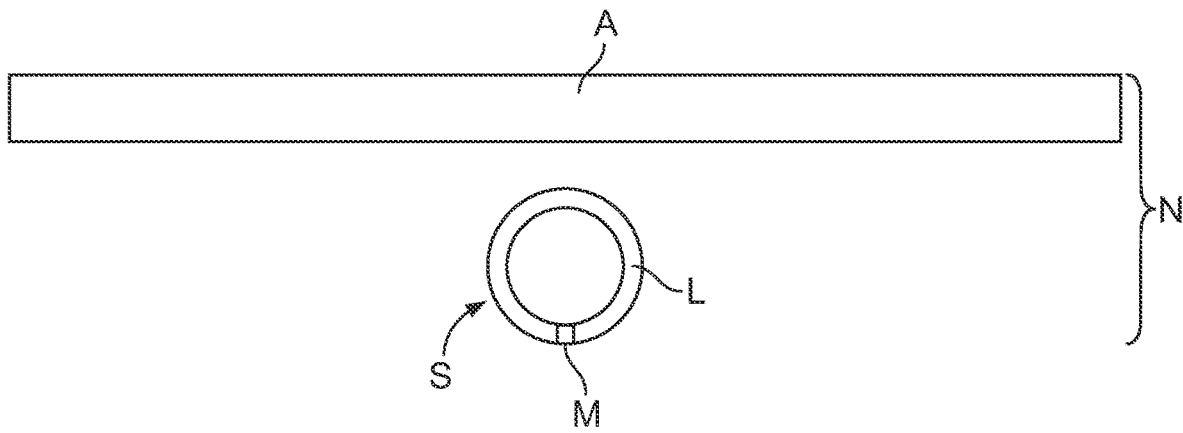
FIG. 1 is a schematic view of a reactive strap and associated antenna according to conventional design.
Figure 2:
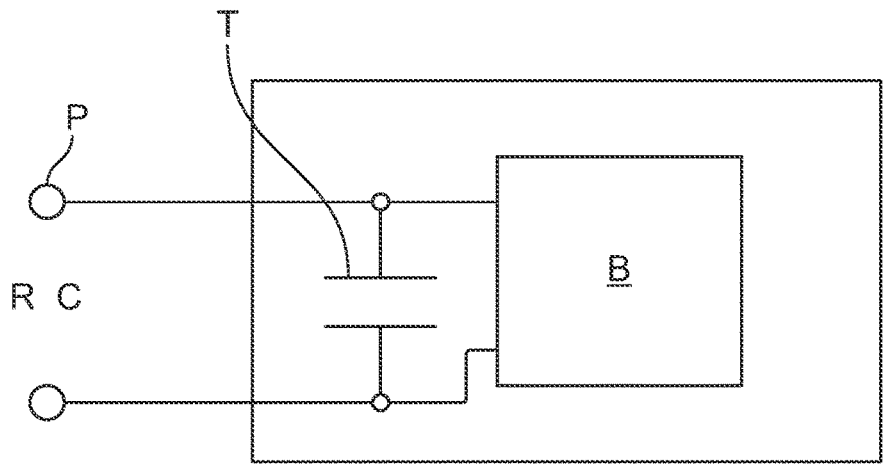
FIGS. 2 and 3 are schematic views of RFID chips according to conventional designs.
Figure 4:
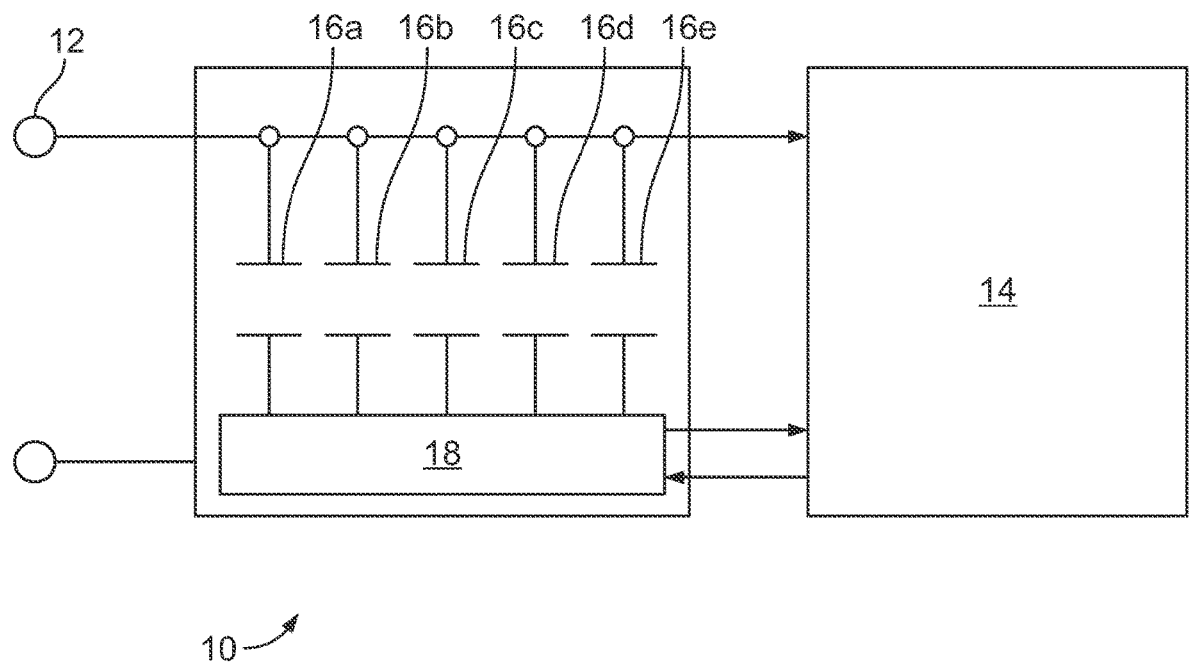
FIG. 4 is a schematic view of an exemplary tuning assembly for a RFID chip according to an aspect of the present disclosure.

FIG. 4 illustrates an exemplary embodiment of a tuning assembly 10 for RFID chip 11 according to an aspect of the present disclosure. The tuning assembly 10 includes an antenna or input port 12 and a control unit 14. A plurality of capacitors 16a-16e are connected in parallel between the input port 12 and the control unit 14. FIG. 4 shows five capacitors, but it should be understood that the tuning assembly 10 according to the present disclosure may include more than five capacitors or fewer than five capacitors. A selector circuit 18 is coupled to each of the capacitors 16 and to the control unit 14. It should be understood that the tuning assembly 10 according to the present disclosure may include other components in addition to the ones shown in FIG. 1, such as a storage or memory unit.

The capacitance of the individual capacitors 16 may vary without departing from the scope of the present disclosure. In one embodiment, each capacitor 16 has a different capacitance, which may be advantageous for making possible a greater number of different combined capacitances within an achievable range, as will be described in greater detail herein. For example, in one exemplary embodiment, a first capacitor 16a has a capacitance of approximately 50 fF, a second capacitor 16b has a capacitance of approximately 100 fF, a third capacitor 16c has a capacitance of approximately 200 fF, a fourth capacitor 16d has a capacitance of approximately 400 fF, and a fifth capacitor 16e has a capacitance of approximately 800 fF. It will be seen that, in this exemplary embodiment, each capacitor 16 (other than the first capacitor 16a) has a capacitance that is double the capacitance of the capacitor 16 having the next lowest capacitance (similar to a binary number sequence). This may be advantageous for enabling a more complete range of possible combined capacitances, as will be described in greater detail herein. While it may be advantageous for each capacitor 16 to have a different capacitance, it is also within the scope of the present disclosure for two or more of the capacitors 16 to have the same capacitance and/or for each capacitor 16 to have the same capacitance.

The selector circuit 18 is configured to selectively allow and prevent current flow through any of the capacitors 16 in response to commands from the control unit 14. By selectively allowing and preventing current flow through different combinations of capacitors 16, the total or combined capacitance of the RFID chip 11 may be adjusted for increased sensitivity. The selector circuit 18 may be variously configured to carry out this function. In one exemplary embodiment, each capacitor 16 includes an associated switch, which is opened by the selector circuit 18 to prevent current flow through the capacitor 16 or closed by the selector circuit 18 to allow current flow through the capacitor 16. Other configurations may also be employed without departing from the scope of the present disclosure.

When the selector circuit 18 acts to prevent current flow through each of the capacitors 16, the capacitors 16 will contribute nothing to the combined capacitance of the RFID chip 11, such that the combined capacitance of the RFID chip 10 is equal to the basic input capacitance of the RFID chip 11 (which is 100 fF in the above-described embodiment). When the selector circuit 18 acts to allow current flow through each of the capacitors 16, the combined capacitance of the RFID chip 11 is equal to the sum of the capacitances of the individual capacitors 16 (1,550 fF in the above-described embodiment) and the basic input capacitance (100 fF in the above-described embodiment), which is a combined capacitance of 1,650 fF in above-described embodiment.

When the selector circuit 18 allows current flow through at least one, but not all of the capacitors 16, the combined capacitance will be somewhere between the basic input capacitance of the RFID chip 11 and the maximum possible capacitance (i.e., the combined capacitance when current flow is allowed through all of the capacitors 16). In the above-described embodiment, combined capacitances (including the basic input capacitance) in the range of 100 fF and 1,650 fF may be achieved, in increments of 50. For example, a combined capacitance of 150 fF may be achieved by the selector circuit 18 allowing current flow through only the first capacitor 16a (which has a capacitance of 50 fF, in addition to the basic input capacitance of 100 fF). A combined capacitance of 200 fF may be achieved by the selector circuit 18 allowing current flow through only the second capacitor 16b (which has a capacitance of 100 fF, in addition to the basic input capacitance of 100 fF). A combined capacitance of 250 fF may be achieved by the selector circuit 18 allowing current flow through only the first and second capacitors 16a and 16b, and so on, up to the maximum achievable combined capacitance. This dense coverage of the range of achievable combined capacitance values may be achieved by any of a number of possible approaches, but may be efficiently achieved (i.e., using a minimal number of capacitors 16) by the capacitors 16 having different capacitance values and due to the difference in capacitance between any pair of capacitors 16 being different from the difference in capacitance between any other pair of capacitors 16, as in the above-described embodiment.

The control unit 14 may be configured to command the selector circuit 18 to automatically and alternatively allow and prevent current flow through each of the capacitors 16 until the maximum sensitivity has been achieved, thereby acting like a conventional auto-tune system. Additionally, the control unit 14 may be configured to issue additional commands to the selector circuit 18, which provides advantages over a conventional auto-tuning arrangement. For example, the control unit 14 may be configured to command the selector circuit 18 to always allow current flow through any one or more of the capacitors 16. This may be advantageous if it is known that the RFID chip 11 is to be used in an application requiring a combined capacitance in a tighter range than the complete range of capacitance values that can be achieved by the RFID chip 11. For example, if it is known (e.g., from testing similarly configured RFID chips in similar applications) that the RFID chip 11 will need to have a combined capacitance of at least some minimum value, the control unit 14 may be configured to command the selector circuit 18 to always allow current flow through the most appropriate capacitors 16 to ensure that the combined capacitance will always be at that minimum value.

Similarly, the control unit 14 may be configured to command the selector circuit 18 to always prevent current flow through any one or more of the capacitors 16, which is also advantageous when it is known that the RFID chip 11 is to be used in an application requiring a combined capacitance in a tighter range than the complete range of capacitance values that can be achieved by the RFID chip 11. For example, if it is known (e.g., from testing similarly configured RFID chips in similar applications) that an RFID chip 11 will need to have a combined capacitance below some maximum value, the control unit 14 may be configured to command the selector circuit 18 to always prevent current flow through the most appropriate capacitors 16 to ensure that the combined capacitance will never be greater than that maximum value.

Figure 3:
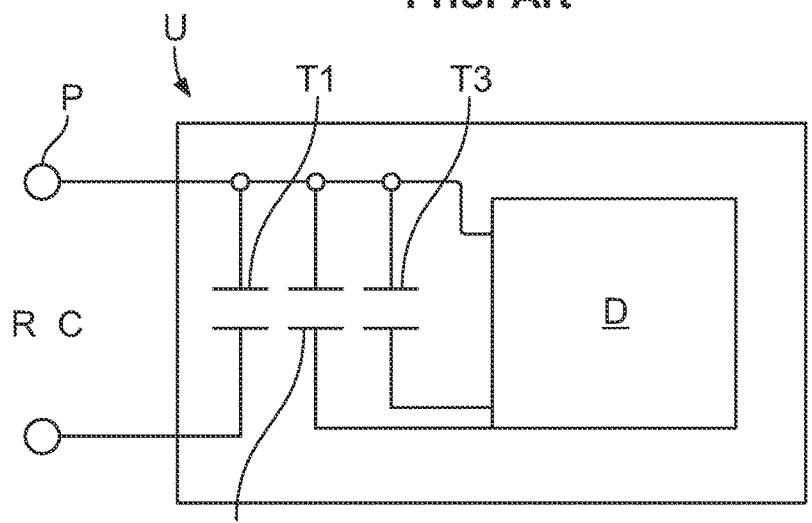

"Freezing" the status of a tunable capacitor 16 (i.e., by always allowing current flow through it or always preventing current flow through it) avoids a possible problem with conventional auto-tune systems. As explained in the description of prior art systems, the starting capacitance of a conventional auto-tunable RFID chip "U" (shown in FIG. 3) may result in such a mismatch between the antenna and the RFID chip "U" that insufficient power is delivered to the auto-adjust circuit "D", such that a higher level of power (associated with lower sensitivity and the need for the RFID inlay to be closer to the RFID reader) is needed to start the auto-tuning process and optimize the power delivered to allow the RFID chip "U" to reach its operating threshold. By "freezing" the status of one or more capacitors 16, the RFID chip 11 according to the present disclosure will have an initial or starting combined capacitance that is sufficiently close to the target value so as to avoid such a mismatch. From the initial configuration (with the status of one or more capacitors 16 possibly "frozen"), the control unit 14 and the selector circuit 18 work together to adjust the status of the individual capacitors 16 that are not "frozen" (comparing the amount of power delivered to the RFID chip 11 via the input port 12 when current flow is allowed through a particular combination of capacitors 16 vs. the amount of power delivered when current flow is allowed through a different combination of capacitors 16) until arriving at the combined capacitance at which the amount of power delivered to the RFID chip 11 via the input port 12 is maximized. Following the comparison, the control unit 14 commands the selector circuit 18 to allow or prevent current flow through any of the one or more of the capacitors 16 based at least in part on the amounts of power delivered to the RFID chip 11 via the input port 12 when current flow is allowed and prevented through any of the one or more of the capacitors 16.

The status of a capacitor 16 may be set (e.g., set to a "frozen" state or set to allow for automatic adjustment) at any of a number of different times and locations. In one embodiment, the status of a capacitor 16 is set before the associated RFID chip 11 (as part of a reactive strap) is coupled to an antenna. In another embodiment, the status of a capacitor 16 is set after the RFID chip 11 has been coupled to an antenna so as to define an RFID inlay. This may include the RFID chip 11 being programmed during an inlay test or after the RFID inlay has been incorporated into an RFID tag or label. This may also include the RFID chip 11 being programmed after it (as part of an RFID tag or label) has been associated to an article.

As it may be difficult to determine the appropriate combined capacitance of an RFID chip 11 before the RFID chip 11 has been placed into service, the present disclosure provides an approach for using data collected from previously deployed RFID chips 11 to allow for the programming of an RFID chip 11 at a relatively early stage of manufacture. By this approach, an RFID reader is operated at a relatively high power to detect an RFID label that has been placed into service (e.g., by being attached to an article of denim clothing or to a cotton shirt). The RFID reader is then operated at a lower power to determine a minimum operating power at which the RFID label is detected. Next, the RFID reader is operated at a power that is greater than the previously identified minimum operating power and the control unit 14 of the tuning assembly 10 for RFID chip 11 of the RFID label is programmed to command the selector circuit 16 to deliver current flow through the capacitors 16 in a different combination so as to achieve a different combined capacitance. The RFID reader is then operated at a power that is less than the previously identified minimum operating power to determine whether a lower minimum operating power has been achieved (i.e., whether the RFID label can be detected at the new capacitance). This process may be repeated until a lowest minimum operating power has been achieved.

The foregoing procedure may be repeated for a plurality of similarly configured and similarly situated RFID labels to determine an average programming (which may include an average combined capacitance). This information may then be used to program the control unit 14 and set the status of the capacitors 16 of future RFID chips 11 relatively early in the manufacturing process (once it is known how the RFID chip 11 will be used), rather than needing to wait until the RFID chip 11 has been placed into service.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A tuning assembly for a RFID chip, comprising:
   an input port;
   a control unit;
   a plurality of capacitors connected in parallel between the input port and the control unit; and
   a selector circuit coupled to each of the capacitors and to the control unit and configured to selectively allow and prevent current flow through any of the capacitors in response to commands from the control unit to adjust the capacitance of the RFID chip, wherein the control unit is configured to issue a plurality of commands to the selector circuit, wherein the plurality of commands comprise:
      a command to always allow current flow through any one or more of the capacitors,
      a command to always prevent current flow through any one or more of the capacitors, and
      a command to selectively allow and prevent current flow through any one or more of the capacitors, based at least in part on a comparison of an amount of power delivered to the RFID chip via the input port when current flow is being allowed through a particular combination of the capacitors to an amount of power delivered to the RFID chip via the input port when current flow is being allowed through a different combination of the capacitors.

2. The tuning assembly of claim 1, wherein each capacitor of the plurality of capacitors has a different capacitance.

3. The tuning assembly of claim 2, wherein a difference in capacitance between any pair of capacitors is different from a difference in capacitance between any other pair of capacitors.

4. The tuning assembly of claim 2, wherein
   one of the capacitors of the plurality of capacitors has a lower capacitance than the other capacitors,
   another one of the plurality of capacitors has a greater capacitance than the other capacitors, and
   each of the other capacitors of the plurality of capacitors has a capacitance that is twice the capacitance of the capacitor having the next lowest capacitance and a capacitance that is half the capacitance of the capacitor having the next greatest capacitance.

5. The tuning assembly of claim 1, wherein each capacitor has a capacitance in a range of approximately 50 fF to approximately 800 fF.

6. The tuning assembly of claim 5, wherein the plurality of capacitors comprise:
   a first capacitor having a capacitance of approximately 50 fF,
   a second capacitor having a capacitance of approximately 100 fF,
   a third capacitor having a capacitance of approximately 200 fF,
   a fourth capacitor having a capacitance of approximately 400 fF, and
   a fifth capacitor having a capacitance of approximately 800 fF.

7. The tuning assembly of claim 1, wherein the plurality of capacitors are configured to provide a combined capacitance between 0 fF and approximately 1550 fF.

8. The tuning assembly of claim 1, wherein the control unit is configured such that the commands to the selector circuit selectively allow and prevent current flow through any of the one or more of the plurality of capacitors to provide a combined capacitance at which an amount of power delivered to the RFID chip via the input port is maximized.

9. The tuning assembly of claim 8, wherein the control unit is configured to command the selector circuit to either always allow or always prevent current flow through at least one of the capacitors.

10. The tuning assembly of claim 1, wherein the tuning assembly enables the RFID chip to couple to a conductive ring and the combination of the RFID chip with the conductive ring defines a reactive strap.

11. A method of manufacturing an RFID inlay including an RFID chip configured to be tuned, the method comprising the steps of:
    providing a tuning assembly for the RFID chip, the tuning assembly comprising an input port, a control unit, a plurality of capacitors connected in parallel between the input port and the control unit, and a selector circuit coupled to each of the capacitors and to the control unit and configured to selectively allow and prevent current flow through any of the capacitors in response to commands from the control unit to adjust the capacitance of the RFID chip; and
    programming the control unit to issue a plurality of commands to the selector circuit, wherein the commands comprise:
       a command to always allow current flow through any one or more of the capacitors,
       a command to always prevent current flow through any one or more of the capacitors, and
       a command to selectively allow and prevent current flow through any one or more of the capacitors, based at least in part on a comparison of an amount of power delivered to the RFID chip via the input port when current flow is being allowed through a particular combination of the capacitors to an amount of power delivered to the RFID chip via the input port when current flow is being allowed through a different combination of the capacitors; and
    coupling the RFID chip to an antenna to define the RFID inlay.

12. The method of claim 11, wherein the control unit is programmed before the RFID chip is coupled to the antenna.

13. The method of claim 11, wherein the control unit is programmed after the RFID chip is coupled to the antenna.

14. The method of claim 11, further comprising subjecting the RFID inlay to a test, wherein the control unit is programmed during said test.

15. The method of claim 14, further comprising incorporating the RFID inlay into an RFID label, wherein the control unit is programmed after the RFID inlay is incorporated into the RFID label.

16. The method of claim 15, further comprising:
    incorporating the RFID inlay into an RFID label, and
    associating the RFID label to an article, wherein the control unit is programmed after the RFID label is associated to the article.

17. The method of claim 15, wherein said programming the control unit comprises:
    (a) operating an RFID reader at a relatively high power to detect the RFID label,
    (b) operating the RFID reader at a lower power to determine a minimum operating power,
    (c) operating the RFID reader at a power that is greater than the minimum operating power,
    (d) programming the control unit while the RFID reader is operating at said power that is greater than the minimum operating power,
    (e) operating the RFID reader at a power that is less than said minimum operating power to determine whether a lower minimum operating power has been achieved, and
    (f) repeating (c)-(e) until a lowest minimum operating power has been achieved.

18. The method of claim 17, further comprising:
    executing (a)-(f) for a plurality of similarly configured and situated RFID labels,
    determining an average programming of the control units of the plurality of similarly configured and situated RFID labels, and
    programming the control unit of at least one RFID chip based at least in part on said average programming.

* * * * *